US012273577B2

(12) United States Patent
Grigsby et al.

(10) Patent No.: US 12,273,577 B2
(45) Date of Patent: *Apr. 8, 2025

(54) ADAPTIVE MULTICAST STREAMING

(71) Applicant: Comcast Cable Communications, LLC, Philadelphia, PA (US)

(72) Inventors: Guy J. Grigsby, Denver, CO (US); Carl Veazey, Longmont, CO (US); Ian Eckart, Thornton, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,657

(22) Filed: Apr. 6, 2023

(65) Prior Publication Data
US 2024/0080510 A1 Mar. 7, 2024

Related U.S. Application Data

(63) Continuation of application No. 16/103,268, filed on Aug. 14, 2018, now Pat. No. 11,659,222.

(51) Int. Cl.
*H04N 21/2662* (2011.01)
*H04L 12/18* (2006.01)
*H04L 65/611* (2022.01)
*H04N 21/235* (2011.01)
*H04N 21/25* (2011.01)
(Continued)

(52) U.S. Cl.
CPC ..... *H04N 21/2662* (2013.01); *H04L 12/1868* (2013.01); *H04L 65/611* (2022.05); *H04N 21/235* (2013.01); *H04N 21/252* (2013.01); *H04N 21/6405* (2013.01); *H04N 21/8456* (2013.01)

(58) Field of Classification Search
CPC .............................. H04N 21/20–80
See application file for complete search history.

(56) References Cited

U.S. PATENT DOCUMENTS 8,219,134 B2   7/2012   Maharajh et al.
8,819,264 B2   8/2014   Rodrigues
2004/0240390 A1  12/2004  Seckin
(Continued)

FOREIGN PATENT DOCUMENTS

EP    2445162 A1    4/2012

OTHER PUBLICATIONS

May 6, 2020—European Extended Search Report—EP 19191669.1.
(Continued)

*Primary Examiner* — Mushfikh I Alam
(74) *Attorney, Agent, or Firm* — Banner & Witcoff, Ltd.

(57) ABSTRACT

Systems, apparatuses, and methods are described for monitoring data transmitted and/or received via multicast transmission and, based on latency, segment loss, and/or other occurrence, modifying sources and/or other characteristics of additional data transmission. The data may be video segments of media content items. Sources of video segments can be changed based on comparisons of rates of arrival of video segments, failure to receive segments, etc. Selection of an encoded version of content for multicast and/or unicast transmission may be based on indications of delay and/or non-receipt, and/or based on predictions of increased load on a network.

20 Claims, 12 Drawing Sheets

(51) Int. Cl.
*H04N 21/6405* (2011.01)
*H04N 21/845* (2011.01)

(56) References Cited

U.S. PATENT DOCUMENTS

| | | |
|---|---|---|
| 2007/0101012 A1 | 5/2007 | Li et al. |
| 2013/0097309 A1 | 4/2013 | Ma et al. |
| 2014/0189754 A1 | 7/2014 | Major et al. |
| 2015/0043580 A1 | 2/2015 | Mantin |
| 2015/0163527 A1* | 6/2015 | Caputo .................... H04N 7/16 725/95 |
| 2016/0044078 A1 | 2/2016 | Hosur |
| 2016/0294898 A1 | 10/2016 | Wheelock |
| 2016/0308958 A1 | 10/2016 | Navali et al. |
| 2017/0070757 A1 | 3/2017 | Phillips et al. |
| 2017/0118263 A1 | 4/2017 | Crabtree et al. |
| 2017/0353516 A1 | 12/2017 | Gordon |
| 2018/0109579 A1 | 4/2018 | Salgueiro et al. |
| 2018/0351868 A1* | 12/2018 | Cartwright ............ H04L 47/125 |
| 2018/0352305 A1 | 12/2018 | Bowen et al. |
| 2019/0296947 A1 | 9/2019 | Major |
| 2019/0327504 A1 | 10/2019 | Jindal et al. |
| 2020/0036766 A1* | 1/2020 | Mahvash ......... H04N 21/23439 |
| 2020/0037029 A1 | 1/2020 | He et al. |

OTHER PUBLICATIONS

Matthias Laabs, Institut fur Rundfunktechnik, Title: Adaptive Multicast Streaming.
Shih-Hsuan Yang and Hong-Bo Chen, Department of Computer Science and Information Engineering, National Taipei University of Technology, The 7th IEEE International Symposium on Next-Generation Electronics (ISNE 2018), Title: Hybrid Unicast and Multicast Video Streaming Using H.264 SVC and FLUTE for Set-Top Box Users.
Jul. 15, 2022—EP Office Action—EP App. No. 19191669.1.

* cited by examiner

ADAPTIVE MULTICAST STREAMING

CROSS-REFERENCE

This application is a continuation of U.S. application Ser. No. 16/103,268, filed on Aug. 14, 2018, which is hereby incorporated by reference in its entirety.

BACKGROUND

Adaptive bitrate streaming technologies allow content providers to deliver the same media content item in a variety of formats, such as in formats that correspond to different bitrates. Multicast transmissions may include adaptive bitrate streaming technologies, but they may not guarantee the delivery of a content stream. Data segments may be dropped, delivered multiple times, or delivered out of sequence. As a result, multicast transmission mechanisms may be operationally wasteful, time-consuming, and otherwise inefficient and/or create an undesirable user experience.

SUMMARY

The following summary presents a simplified summary of certain features. The summary is not an extensive overview and is not intended to identify key or critical elements.

Systems, apparatuses, and methods are described for switching receipt of segments of a media content item between one or more multicast transmissions and/or a unicast transmission. A computing device may receive segments of a media content item via a multicast transmission at a first bitrate and, after a determination of a rate of arrival of the segments of the media content item, may switch to receive any remainder of the segments of the media content item via a lower bitrate multicast transmission and/or a unicast transmission. Because the rate of arrival of segments may be compared to a known rate of transmission of the segments, a high quality multicast transmission streaming system may be implemented with a unicast transmission as a fallback for smoother receipt of segments as may be appropriate.

In another example method, system, and apparatus, a computing device may send a first plurality of segments of media content item to a plurality of other computing devices via a multicast transmission at a first bitrate. The first computing device may receive one or more signals indicating a failure of one or more of the plurality of computing devices to receive one or more of the segments of the first plurality of segments of the media content item. The first computing device may determine whether the one or more signals satisfies a threshold number of signals, and if so, the first computing device may send via a multicast transmission and at a second bitrate, a second plurality of segments of the media content item.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
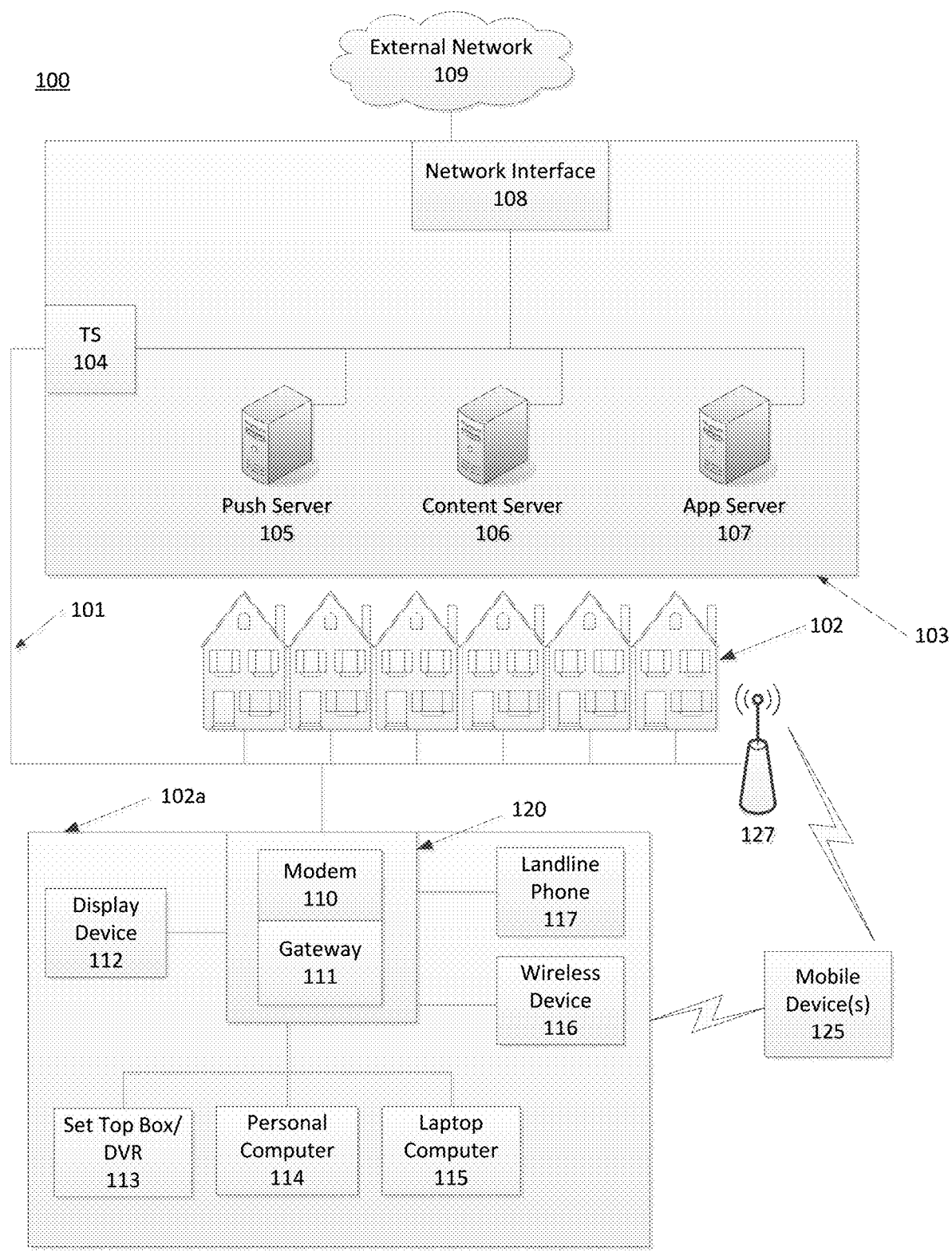
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

Communication links 101 may originate from the local office 103 and may be split to exchange information signals with the various premises 102. The communication links 101 may include components not shown, such as splitters, filters, amplifiers, etc. to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels.

The local office 103 may include an interface 104, such as a termination system (TS). The interface 104 may be a cable modem termination system (CMTS), which may be a computing device configured to manage communications between devices on the network of the communication links 101 and backend devices such as servers 105-107. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The content server 106 may be one or more computing devices that are configured to provide content to devices at premises. This content may be a variety of media content items, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). One content server may be a computing device configured to receive a media content item, such as a television program, and to transmit the media content item in a sequence of segments. Each segment may include a short interval of playback time of the television program that is potentially many hours in duration, such as a movie or a live sports event. The size of a segment may be of any length, such as between two (2) and ten (10) seconds. The content server may be configured to transmit the sequence of segments as a multicast transmission server that transmits the segments at a high bitrate. Another content server may be configured to transmit the sequence of segments as a multicast transmission server that transmits the segments at a lower bitrate in comparison to the first content server. Still additional content servers may be configured to transmit the sequence of segments as a multicast transmission server that transmits the segments at even lower bitrates, including some minimum bitrate. Finally another content server or content servers may be configured to transmit one or more of the sequence of segments as a unicast transmission server.

The push notification server 105 may generate push notifications to deliver data and/or commands to the various premises 102 in the network (or more specifically, to the devices in the premises 102 that are configured to detect such notifications). The push notification server 105 may generate push notifications to deliver data and/or commands to other servers, such as the content server 106 and application server 107, in the network. Once such command may be an instruction for a content server 106 to retransmit one or more particular segments of content. The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The local office 103 may include additional servers, including additional push, content, and/or application servers, and/or other types of servers. Although shown separately, the push server 105, the content server 106, and the application server 107, and/or other server(s) may be combined. The servers 105, 106, and 107, and/or other servers, may be computing devices and may include memory storing data and also storing computer executable instructions that, when executed by one or more processors, cause the server(s) to perform steps described herein.

An example premise 102a may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may comprise a set-top box (STB), digital video recorder (DVR), a digital transport adapter (DTA), computer server, and/or any other desired computing device. The gateway interface device 111 may also include local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premise 102a may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

Mobile devices 125 may communicate with a local office 103 including, for example, with the content server 106.

Mobile devices 125 may be cell phones, smartphones, tablets (e.g., with cellular transceivers), laptops (e.g., communicatively coupled to cellular transceivers), wearable devices (e.g., smart watches, electronic eye-glasses, etc.), or any other mobile computing devices. Mobile devices 125 may store, output, and/or otherwise use assets. An asset may be a video, a game, one or more images, software, audio, text, webpage(s), and/or other content. Mobile devices 125 may include Wi-Fi transceivers, cellular transceivers, satellite transceivers, and/or global positioning system (GPS) components.

Figure 2:
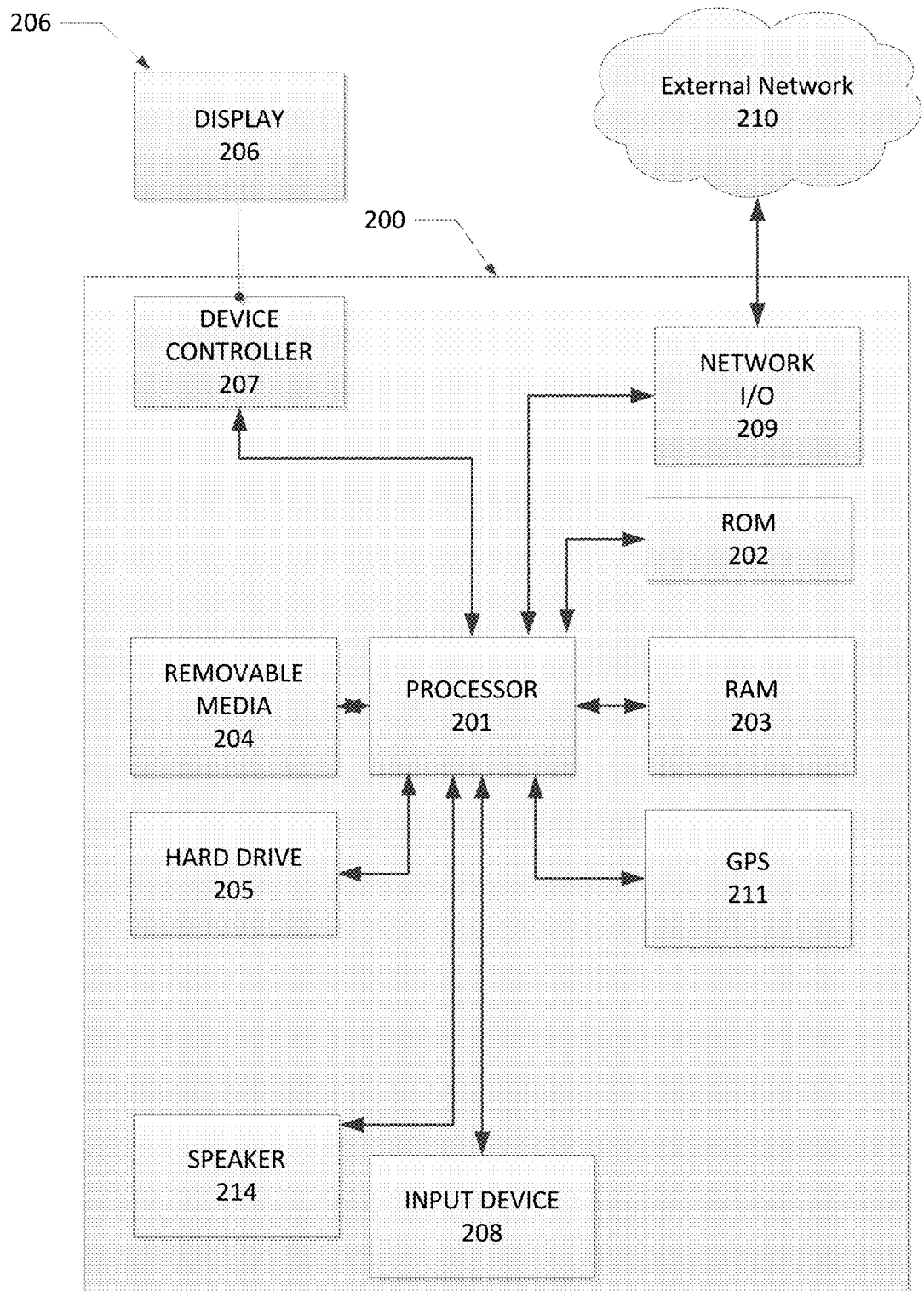
FIG. 2 shows hardware elements of a computing device.

FIG. 2 shows hardware elements of a computing device that may be used to implement any of the computing devices discussed herein (e.g., client devices 301, 903, and 905, multicast servers 303, 305, and 901, unicast server 307, and control server 705). The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
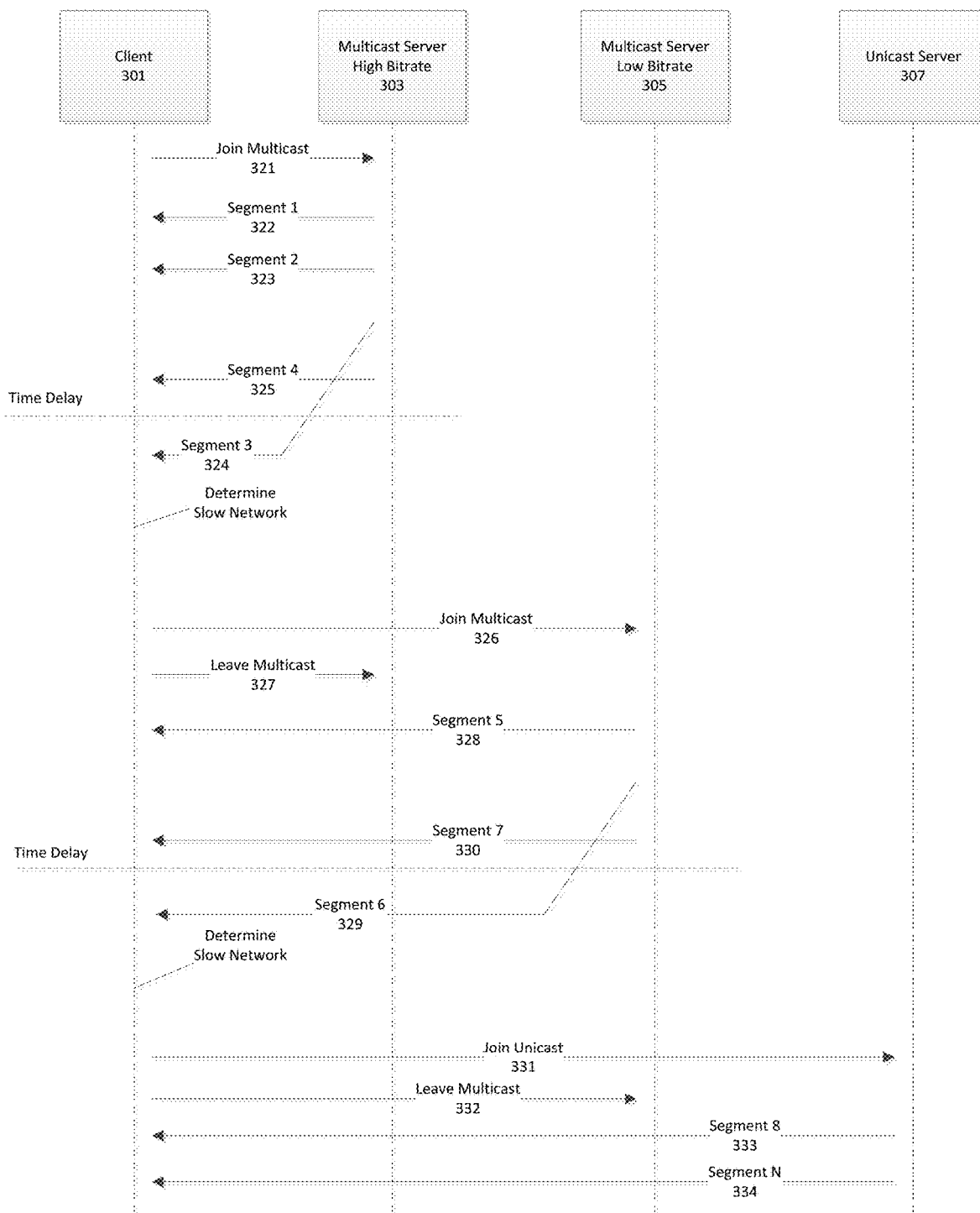
FIG. 3 shows an example system for adaptive media content streaming.

FIG. 3 shows an example system for adaptive media content streaming. A client device 301 may seek to access a media content item for playback. The client device 301 may be a computing device, such as a gateway interface device 111, an STB or DVR 113, a personal computer 114, a laptop computer 115, a wireless device 116, and/or a mobile device 125. A media content item from a media source, such as the content server 106, may be encoded by one or more encoders (not shown) into different versions of the encoded media content item.

Each of the encoders may be an encoding software program executing on a computing device. For example, each of the encoders may comprise instructions stored in a memory and that, when executed by one or more processors of a computing device, cause that computing device to encode a media content item using a video encoding standard such as, e.g., MPEG-1, MPEG-2, MPEG-4 AVC, VP8, VP9, AV1, or and/or other encoding standard. Each of the encoders may be executing on a separate computing device, or some or all of the encoders may be executing on a single computing device.

A high-bitrate multicast server 303 transmitting at a high bitrate, a low-bitrate multicast server 305 transmitting at a low bitrate, and a unicast server 307 may be one or more computing devices configured to transmit one or more of the encoded versions of the media content item. For example, the high-bitrate multicast server 303 may be configured to transmit an encoded version of a media content item at a bitrate that is the highest bitrate version being transmitted and/or that is a highest resolution version of the media content item that is being transmitted. The low-bitrate multicast server 305 transmitting may be configured to transmit an encoded version of the media content item at a bitrate that is the lowest version being transmitted and/or that is a lowest resolution version of the media content item that is being transmitted. Alternatively the low-bitrate multicast server 305 may be configured to transmit an encoded version of the media content item at a bitrate that is lower than the bitrate at which the high resolution multicast server 303 is transmitting and/or that is at a resolution that is lower than that being transmitted by the high resolution server 303. Although not shown additional multicast servers also may be included. Each of these additional multicast servers may be configured to transmit an encoded version of the media content item at a bitrate between the highest bitrate and the lowest bitrate being transmitted and/or transmit an encoded version of the media content item at a resolution between the highest resolution and the lowest resolution. The unicast server 307 also may be configured to transmit an encoded version of a media content item. For each of the servers 303, 305, and 307, the server may be configured to transmit the encoded version of the media content item in one or more segments.

Each of the servers 303, 305, and 307, may transmit its associated version of the content item in segments, and each of the segments may contain data for a portion of the content item that represents some period of the playback time of the content item. A segment at one version sent by one of the servers 301, 305, or 307 may, but need not, represent the exact same period of playback. For example, a high-resolution version of the segment might correspond to a 2 second part of a movie (e.g., from 1:01:30.0 to 1:01:32.0), and a low-resolution version may correspond to a 3.5 second part of the movie (1:01:29.0 to 1:01:32.5). In addition, segments may not begin or end at the same part of the content item.

The media content item transmitted by the servers 303, 305, and/or 307 to the client device 301 may be any form or type of content. Examples of content type comprise video of a movie, video of a television show, video a video game, video for a real-time video feed, and other types of video. A segment may be of any arbitrary length that is a part of the media content item (e.g., a five-second segment of a film). The versions of a media content item may comprise versions that have been encoded in different ways so as to have different bitrates, e.g., so as to have different values for maximum and/or average bitrate. The bitrates of the different versions may be selected from a plurality of possible bitrates. Video encoded at different bitrate values may be best transmitted over different network interfaces and/or under different network conditions, and may be utilized by the different servers 303, 305, and/or 307 as applicable to accommodate a variety of possible network conditions, interfaces, and/or capabilities of receiving devices. As such, the plurality of possible bitrates may be predetermined and/or based on one or more network interfaces. A plurality of predefined, discrete bitrates may be available for encoding at each of multiple resolutions.

The client device 301 may join a multicast group that is receiving segments of an encoded media content item from the high-bitrate multicast server 303 for playback of that media content item. The client device 301 may be but one example computing device that may seek to join the multicast group that is receiving a multicast transmission from the high-bitrate multicast server 303. Any of a number of client devices may seek to join the multicast group that is receiving a multicast transmission from the high-bitrate multicast server 303. The high-bitrate multicast server 303 may apply a sequence to transmit segments of the media content item. For example, the high-bitrate multicast server 303 may transmit the segments of a media content item as a sequence of ordered segments. Segment 1 322, Segment 2 323, Segment 3 324, and Segment 4 325 are shown transmitted by the high-bitrate multicast server 303. In this example, the Segment 3 324 is received out of sequence in comparison to the Segment 1 322, the Segment 2 323, and the Segment 4 325. In addition, although the Segment 3 324 eventually was received by the client device 301, it was only received after some threshold time delay period. This latency in segment receipt may be an example where the client device 301 can no longer wait to receive segments for playback since such latency is outside of an allowable threshold to ensure playback of the content item as desired by a viewer. Patterns associated with latency in segment rate of arrival and/or failing to receive a segment at all may be recognized. One manner for recognition of such patterns comprises reinforced machine learning algorithms. A Deterministic Deep Policy Gradient algorithm and a Monte Carlo Policy Gradient algorithm are two example reinforced machine learning algorithms. A data unit may refer to a chunk of data from a server that contains the encoded data for a segment. User Datagram Protocol (UDP) datagrams are such data units. Because UDP datagrams may be the first data units to be dropped or to have receipt delayed in event of congestion or other problems in a network, a pattern for losses of one or more UDP datagram altogether or in a timely manner can be recognized by the rate of arrival of those UDP datagrams that are received in a timely manner. Because the amount of video/audio in a datagram is known (e.g., a segment of 5 seconds of video), the rate at which the datagrams will be needed for playback may be estimated. Utilizing reinforced machine learning algorithms, one or more patterns associated with segment loss versus latency in segment arrival may be recognized and then applied to determine what action client device 301 should take. Such patterns may indicates that at least one additional segment is to be received via unicast or via multicast transmission at a lower bitrate.

Having determined a slow network for receipt of segments from the high-bitrate multicast server 303, the client device 301 may switch to receive the next segments of the same media content item from the low-bitrate multicast server 305. The client device 301 may join a multicast group that is receiving a multicast transmission from the low-bitrate multicast server 305 to receive segments that it would then use to playback subsequent portions of the media content item. After successfully joining the multicast group that is receiving the multicast transmission from the low-bitrate multicast server 305, the client device 301 may leave the multicast group receiving the multicast transmission from the high-bitrate multicast server 303, e.g., the client device 301 may stop receiving segments from the high-bitrate multicast server 303. The low-bitrate multicast server 305 may apply the same sequence utilized by the high-bitrate multicast server 303 to transmit segments of the media content item in a sequence corresponding to sequential parts of the content item playback. For example, Segment 5 328, Segment 6 329, and Segment 7 330 are shown transmitted by the low-bitrate multicast server 305. In this example, the Segment 6 329 is received out of sequence in comparison to the Segment 5 328 and the Segment 7 330. In addition, although the Segment 6 329 eventually was received by client device 301, it was only received after some threshold time delay period. Again, this latency in segment receipt may be an example where the client device 301 can no longer wait to receive segments for playback from the low-bitrate multicast server 305 since such latency is outside of an allowable threshold to ensure playback of the content item as desired by a viewer. Utilizing reinforced machine learning algorithms again, one or more patterns associated with segment loss versus latency in segment arrival may be recognized and then applied to determine what action client device 301 should take.

Having determined a slow network for receipt of segments from the low-bitrate multicast server 305, the client device 301 may switch to receive the next segments of the same media content item from the unicast server 307. The client device 301 is shown to request data from the unicast server 331 for playback of the next segments of the media content item. After successfully joining the unicast server 307, the client device 301 may leave the multicast group that is receiving the multicast transmission from the low-bitrate multicast server 332, e.g., may no longer receive segments from the low-bitrate multicast server 305. The unicast server 307 applies the same sequence utilized by the high- and low-bitrate multicast servers 303 and 305 to transmit segments of the media content item. For example, Segment 8 333 and Segment N 334 are shown transmitted by the unicast server 307. In another example, having determined a slow network for receipt of segments from the high-bitrate multicast server 303, the client device 301 may switch to receive the next segments of the same media content item from the unicast server 307 instead of to receive the next segments of the same media content item from the lower-bitrate multicast server 305.

Figure 4A:
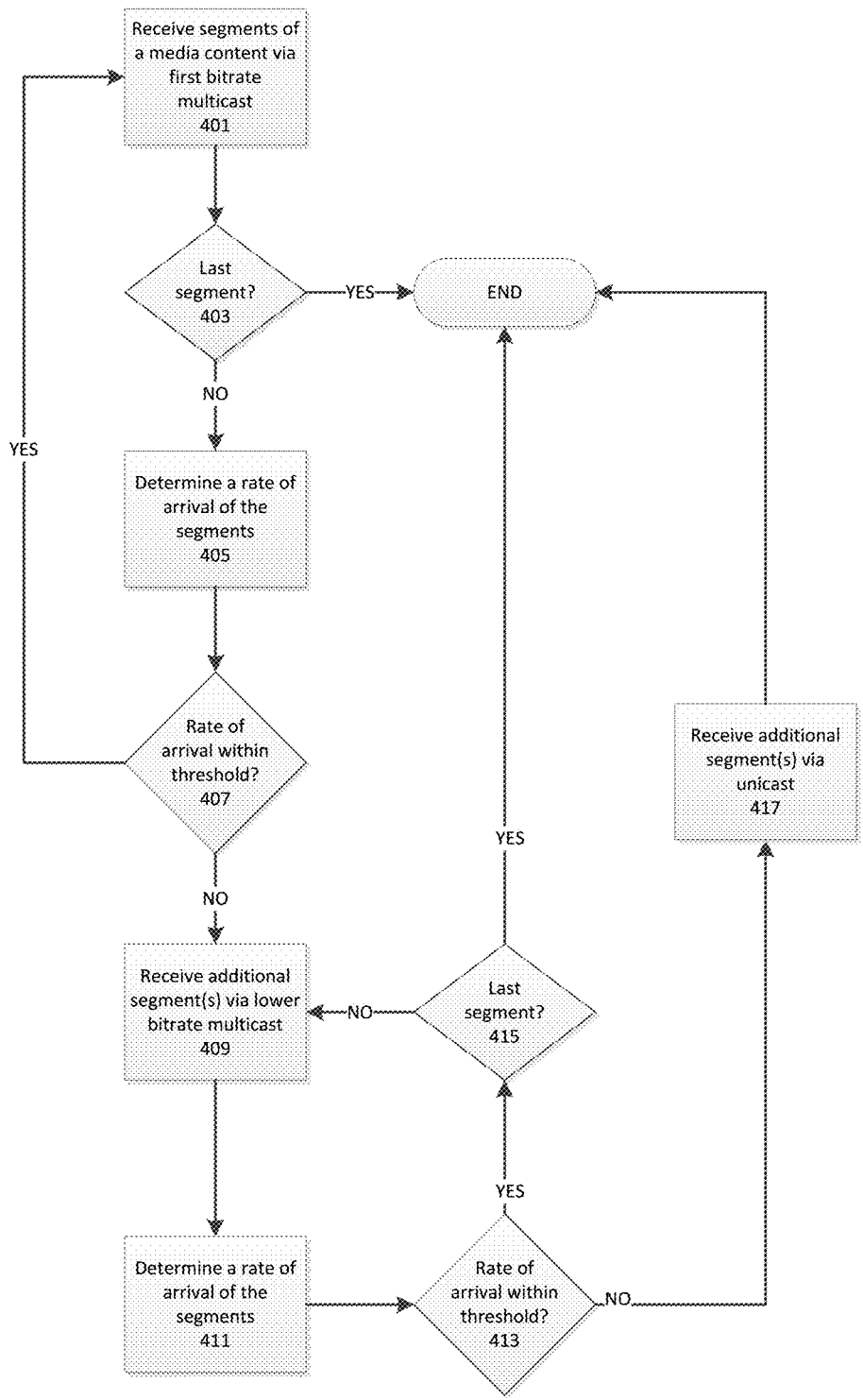
FIGS. 4A and 4B are flow charts showing example methods for changing reception of a media content item.

FIG. 4A is a flow chart showing an example method for changing reception of a media content item. The media content item (e.g., an entire television show) may be split into discrete segments (e.g., for every five seconds and/or on a scene-by-scene basis). In step 401, a computing device may receive segments of a media content item via a multicast transmission at a first bitrate, e.g., by joining a multicast transmission that provides content at the first bitrate. The computing device may be the client device 301 and receipt of the segments via the multicast transmission at the first bitrate may be from the high-bitrate multicast server 303. In another example, the receipt of the segments via the multicast transmission at the first bitrate may be from a multicast server transmitting segments at a medium bitrate in comparison to other multicast servers transmitting different version of the same segments of the media content item. The first bitrate of the multicast transmission in step 401 may be a high bitrate.

At step 403, a determination may be made as to whether the last segment of the segments of the media content item has been received. If not, the process may proceed to step 405. If the last segment is confirmed as received in step 403, the process may end. In step 405, a rate of arrival of the segments of the media content item may be determined. The rate of arrival of the segments may be determined by an established sequence for transmission and expected receipt. A threshold rate of arrival for segments received from the server 303 may be known and/or established for comparison against the rate of arrival of the segments. Proceeding to step 407, a determination may be made as to whether the rate of arrival of a plurality of the segments is within a threshold rate of arrival. The determination in step 407 may be whether the rate of arrival satisfies the threshold. Depending on how that threshold is defined, the threshold may be satisfied if the rate of arrival is, e.g., above the threshold, is above or equal to the threshold, or is above (or above or equal to) the threshold plus some offset. Patterns associated with latency in segment rate of arrival and/or missing the arrival of a segment altogether may be recognized. One manner for recognition of such patterns comprises reinforced machine learning algorithms. Because the segments of the media content item are transmitted in accordance with an established sequence for transmission, late arrival beyond some threshold rate of arrival and/or failure to receive a segment at all may be representative of a time delay requiring a switch to a lower bitrate multicast server, such as the low-bitrate multicast server 305, and/or a unicast server, such as unicast server 307. If the rate of arrival of the segments is within a threshold rate of arrival, the process may proceed back to step 401.

Returning to step 407, if the rate of arrival of the segments does not satisfy a threshold rate of arrival (e.g., the rate of arrival exceeds the threshold rate of arrival), the process proceeds to step 409 where the computing device may receive additional segments of the media content item via a multicast transmission at a second lower bitrate. The second lower bitrate of the multicast transmission in step 409 may be a medium bitrate or a lowest bitrate version of the media content item being transmitted. The computing device may receive the additional segments in step 409 from the low-bitrate multicast server 305.

In step 411, a rate of arrival of the segments of the media content item may be determined. The rate of arrival of the segments may be determined by an established sequence for transmission and expected receipt. A threshold rate of arrival associated with receipt of segments from the server 305 may be known and/or established for comparison against the rate of arrival of the segments. Proceeding to step 413, a determination may be made as to whether the rate of arrival of a plurality of the segments received in step 411 is within a threshold rate of arrival. In this example, the threshold rate of arrival of segments received from the lower bitrate multicast server may be different from the threshold rate of arrival of segments form the high-bitrate multicast server in step 407. If the rate of arrival of the segments in step 411 is within a threshold rate of arrival, the process may proceed to step 415 where a determination is made as to whether the last segment of the segments of the media content item has been received. If not, the process may return to step 409 for the next segment. If the last segment is confirmed as received in step 415, the process may end.

Returning to step 413, if the rate of arrival of the segments does not satisfy a threshold rate of arrival (e.g., the rate of arrival exceeds the threshold rate of arrival), the process may proceed to step 417 where the computing device may receive additional segments of the media content item via a unicast transmission and the process may end. The computing device may receive the additional segments in step 417 from the unicast server 307.

Figure 4B:
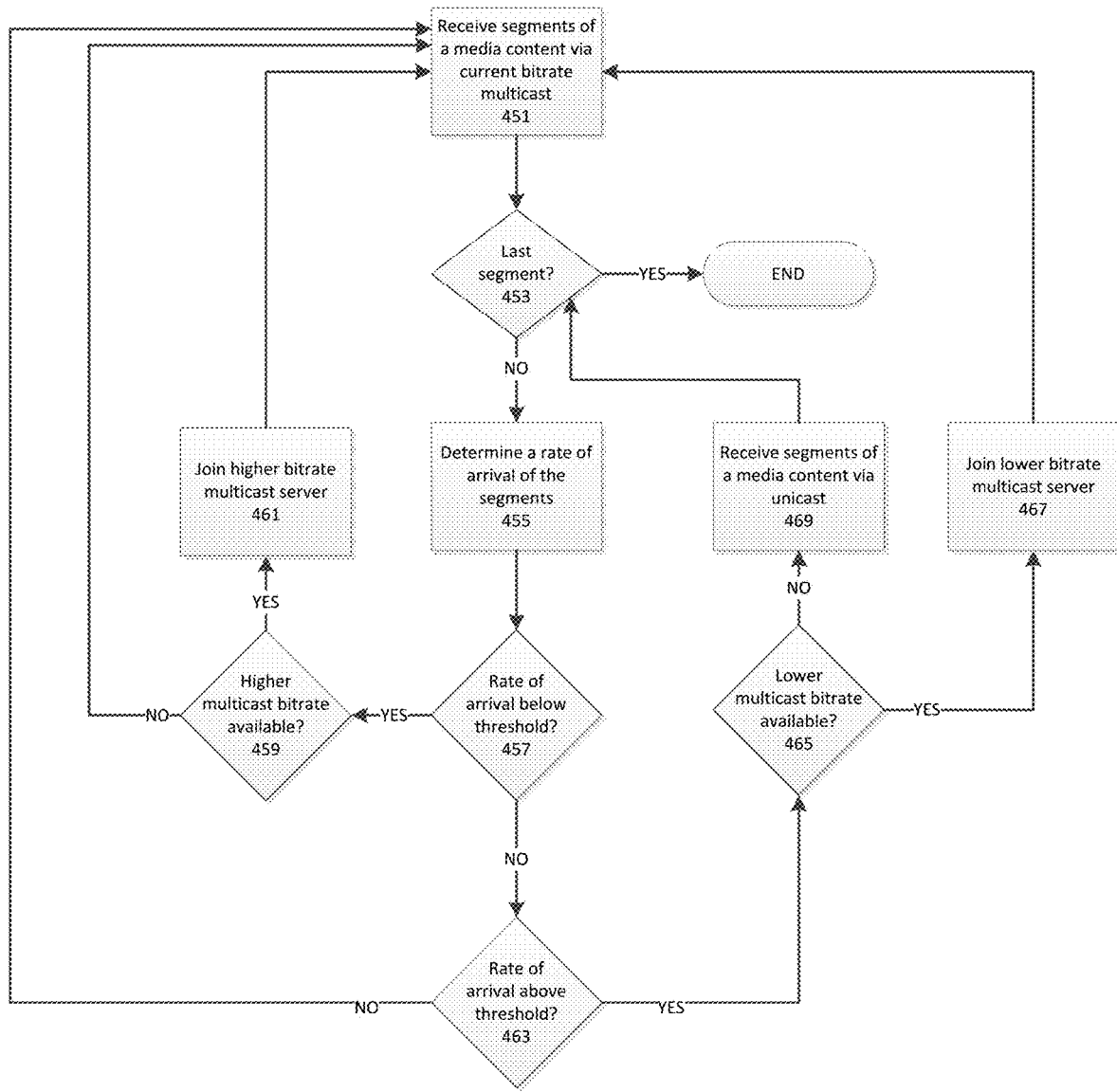

Similar to FIG. 4A, FIG. 4B is another flow chart showing an example method for changing reception of a media content item. The media content item again may be split into discrete segments. In step 451, a computing device may receive segments of a media content item via a multicast transmission at a current bitrate. At step 453, a determination may be made as to whether the last segment of the segments of the media content item has been received. If not, the process may proceed to step 455. If the last segment is confirmed as received in step 453, the process may end. In step 455, a rate of arrival of the segments of the media content item may be determined. Proceeding to step 457, a determination may be made as to whether the rate of arrival of a plurality of the segments is below a threshold rate of arrival. The determination in step 457 may be whether the rate of arrival satisfies the threshold. If the rate of arrival of the segments is below a threshold rate of arrival in step 457, the process may move to step 459.

In step 459, a determination may be made as to whether a higher bitrate multicast transmission is available, such as from high bitrate multicast server 303. If a higher bitrate multicast transmission is available, the process may proceed to step 461 where the computing device may join a higher bitrate multicast transmission and/or associated server to then proceed back to step 451 to receive the next additional segment at the higher bitrate. If a higher bitrate multicast transmission is not available in step 459, the process may proceed back to step 451 for the computing device to receive the next additional segment at the same current bitrate.

Returning to step 457, if the rate of arrival of the segments is not below a threshold rate of arrival, the process may move to step 463 where a determination may be made as to whether the rate of arrival of a plurality of the segments is above a threshold rate of arrival. If the rate of arrival of the segments is not above a threshold rate of arrival, the process may proceed back to step 451 for the computing device to receive the next additional segment at the same current bitrate. If the rate of arrival of the segments is above a threshold rate of arrival in step 463, the process may move to step 465.

In step 465, a determination may be made as to whether a lower bitrate multicast transmission is available, such as from low bitrate multicast server 305. If a lower bitrate multicast transmission is available, the process may proceed to step 467 where the computing device may join a lower bitrate multicast server to then proceed back to step 451 to receive the next additional segment at the lower bitrate. If a lower bitrate multicast transmission is not available in step 465, the process may proceed to step 469 where the computing device may receive the additional segment of the media content item via a unicast transmission and return to step 453. The computing device may receive the additional segments in step 469 from the unicast server 307.

Figure 5:
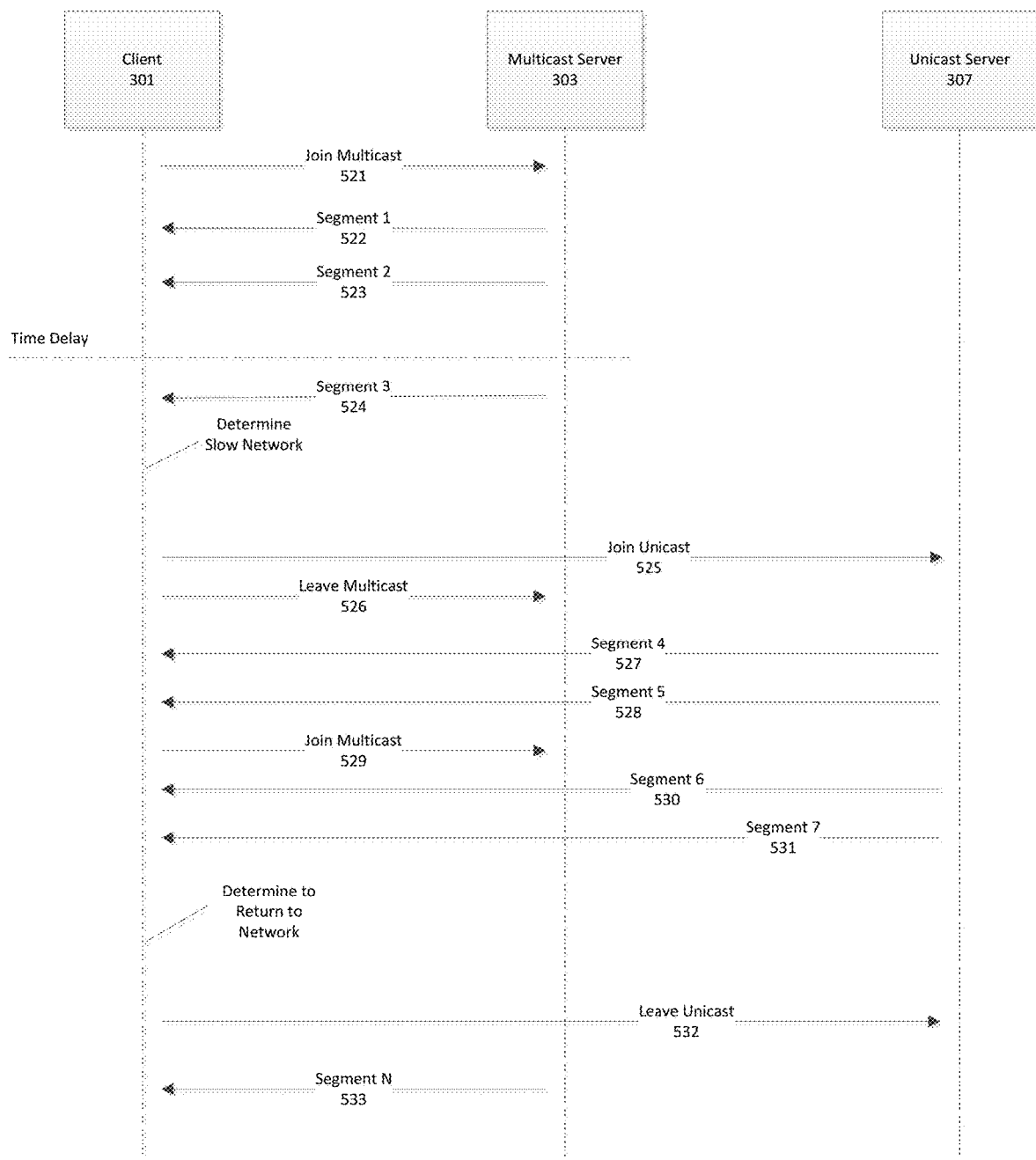
FIG. 5 shows another example system for adaptive media content streaming.

FIG. 5 shows another example system for adaptive media content streaming. The client device 301 may join a multicast group that is receiving a multicast transmission from the multicast server 521 to receive segments of a media content item for playback. The client device 301 is but one example computing device that make seek to join the multicast group that is receiving the multicast transmission from the multicast server 303. Any of a number of client devices may seek to join the multicast group that is receiving the multicast transmission from the multicast server 303. The multicast server 303 applies a sequence to transmit segments of the media content item. For example, multicast server 303 may transmit the segments of a media content item as a sequence of ordered segments. Segment 1 522, Segment 2 523, and Segment 3 524 are shown transmitted by the multicast server 303. In this example, although Segment 3 524 eventually was received by client device 301, it was only received after some threshold time delay period.

Having determined a slow network for receipt of segments from the multicast server 303, the client device 301 may switch to receive the next segments of the same media content item from the unicast server 307. Client device 301 may request data from the unicast server 525 to receive the next segments of the media content item for playback. After successfully joining the unicast server 307, the client device 301 may stop receiving segments from the multicast server 303. The unicast server 307 applies the same sequence utilized by the multicast server 303 to transmit segments of the media content item. For example, Segment 4 527, Segment 5 528, Segment 6 530, and Segment 7 531 are shown transmitted by the unicast server 307.

Because network conditions may change and the load on a network may lighten to the point that a return to a multicast server for receipt of segments of a media content item is preferred, the client device 301 may rejoin the multicast group that is receiving the multicast transmission from the multicast server 529 to receive segments of a media content item for playback. In this example, the client device 301 continues to remain joined to the unicast server 307 and receive Segment 6 530 and Segment 7 531. After rejoining the multicast group that is receiving a multicast transmission from the multicast server 303, the client device 301 may monitor the transmission of segments by the multicast server 303 in order to determine whether to switch back to receiving segments of the media content item from the multicast server 303. Having determined to return to the multicast server for receipt of segments, the client device 301 is shown to leave the unicast server 532, e.g., no longer receiving segments from the unicast server 307. The client device 301 then may receive the next segments (e.g., Segment N 533) of the same media content item from the multicast server 303.

In order for the client device 301 to determine whether to leave the unicast server 532 and only receive additional segments N 533 from the multicast server 303, the client device 301 may look to the rate of arrival of segments received from the multicast server 303 since rejoining 529. Latency in segment receipt and/or missed segment altogether may be an example where the client device 301 determines that it cannot receive segments for playback from the multicast server 303. Utilizing reinforced machine learning algorithms again, one or more patterns associated with segment loss versus latency in segment arrival may be recognized and then applied to determine what action client device 301 should take. If network problems persist, the rate of arrival of segments from the multicast server 303 may be periodically sampled. However, if the previous latency and/or segment loss that earlier caused the client device 301 determine to switch 525 to the unicast server 307 and leave 526 the multicast server 305 is no longer an issue, the client device may determine to switch back to receiving segments from the multicast server 303.

In an example of different versions of a same content item being transmitted in a sequence by a multicast server 303 and a unicast server 307, the timing of receipt of segments by a client device 301 may not be the same. Client device 301 may need to determine what parts of the content item are contained in segments from one source, e.g., the multicast server 303, and what parts are contained in segments from another source, e.g., the unicast server 307, to then determine whether there is an offset between playback time of the content item when received from one source compared to from the other source. Client device 301 may determine an indicator of a playback position of the media content item. One such indicator may be a time stamp, e.g., a time in the playback at which the portion in the segment begins. Client device 301 may determine a time stamp for receipt of a segment of the media content item from the multicast server 303 and a time stamp for receipt of a segment of the media content items from the unicast server 307 where at least some same part of the content item commonly exists in the two segments. For example, the segment from the multicast server 303 may represent a 2 second part of a movie (e.g., from 1:01:30.0 to 1:01:32.0), and the segment form the unicast server may represent a 3.5 second part of the movie (e.g., from 1:01:30.5 to 1:01:34.0). Thus the two segments share a common 1.5 second part of the movie (e.g., 1:01:30.5-1:01:32.0). The segment from the multicast server 303 and the segment from the unicast server from 307 may not necessarily have equal-sized parts of the content item and/or may not have parts of the content item that start and/or stop at the exact same places in the content item; however, these two segments may each contain data that represents at least some of the same part of the content item.

After determining a difference in the time stamps, the client device 301 may take responsive action. In the example of switching from the multicast server 303 to the unicast server 307, if the unicast server 307 is ahead of time in transmitting segments in comparison to the multicast server 303, segments of the media content item received from the unicast server 307 may be buffered until the difference in the time stamps has elapsed, so that a received multicast segment contains a same part of the content item as the first segment received from the unicast server 307. For example, if the client device 301 receives a segment from the unicast server 307 ten (10) seconds before the client device 301 receives a segment from the multicast server 303 that contains a same part of the content item, any segments received from the unicast server 307 before receiving the segment from the multicast server 303 (a ten second time period) may be buffered by the client device. Once the difference in the time stamps has elapsed, the segments received from both sources contain a same part of the content item and the client device may leave the multicast server 303, e.g., no longer receiving segments from the multicast server 303. In addition the client device 301 may begin playback of the buffered segments.

In another example of switching from the multicast server 303 to the unicast server 307, if the multicast server 303 is ahead of time in transmitting segments in comparison to the unicast server 307, segments of the media content item received from the multicast server 303 may be played back immediately until the difference in the time stamps has elapsed so that a received multicast segment contains a same part of the content item as the first segment received from the unicast server 307. For example, if the client device 301 receives a segment from the multicast server 303 ten (10) seconds before the client device 301 receives a segment from the unicast server 307 that contains a same part of the content item, any segments received from the multicast server 303 may be buffered by the client device 301 for a ten second time period. Once the difference in the time stamps has elapsed, the segments received from both sources contain a same part of the content item and the client device may leave the multicast server 303, e.g., no longer receiving segments from the multicast server 303.

In the example of switching from the unicast server 307 to the multicast server 303, if the unicast server 307 is ahead of time in transmitting a segment that contains a same part of the media content item in comparison to the multicast server 303, segments of the media content item received from the unicast server 307 may be played back immediately until the difference in the time stamps has elapsed so that a received multicast segment contains a same part of the content item as a segment received from the unicast server 307. Once the difference in the time stamps has elapsed, the segments received from both sources contain a same part of the content item and the client device may leave the unicast server 307, e.g., no longer receiving segments from the unicast server 307. In another example of switching from the unicast server 307 to the multicast server 303, if the multicast server 303 is ahead of time in transmitting a segment that contains a same part of the media content item in comparison to the unicast server 307, segments of the media content item received from the multicast server 307 may be buffered until the difference in the time stamps has elapsed so that a received multicast segment contains a same part of the content item as a segment received from the unicast server 307. Once the difference in the time stamps has elapsed, the segments received from both sources contain a same part of the content item and the client device may leave the unicast server 307, e.g., no longer receiving segments from the unicast server 307.

Figure 6:
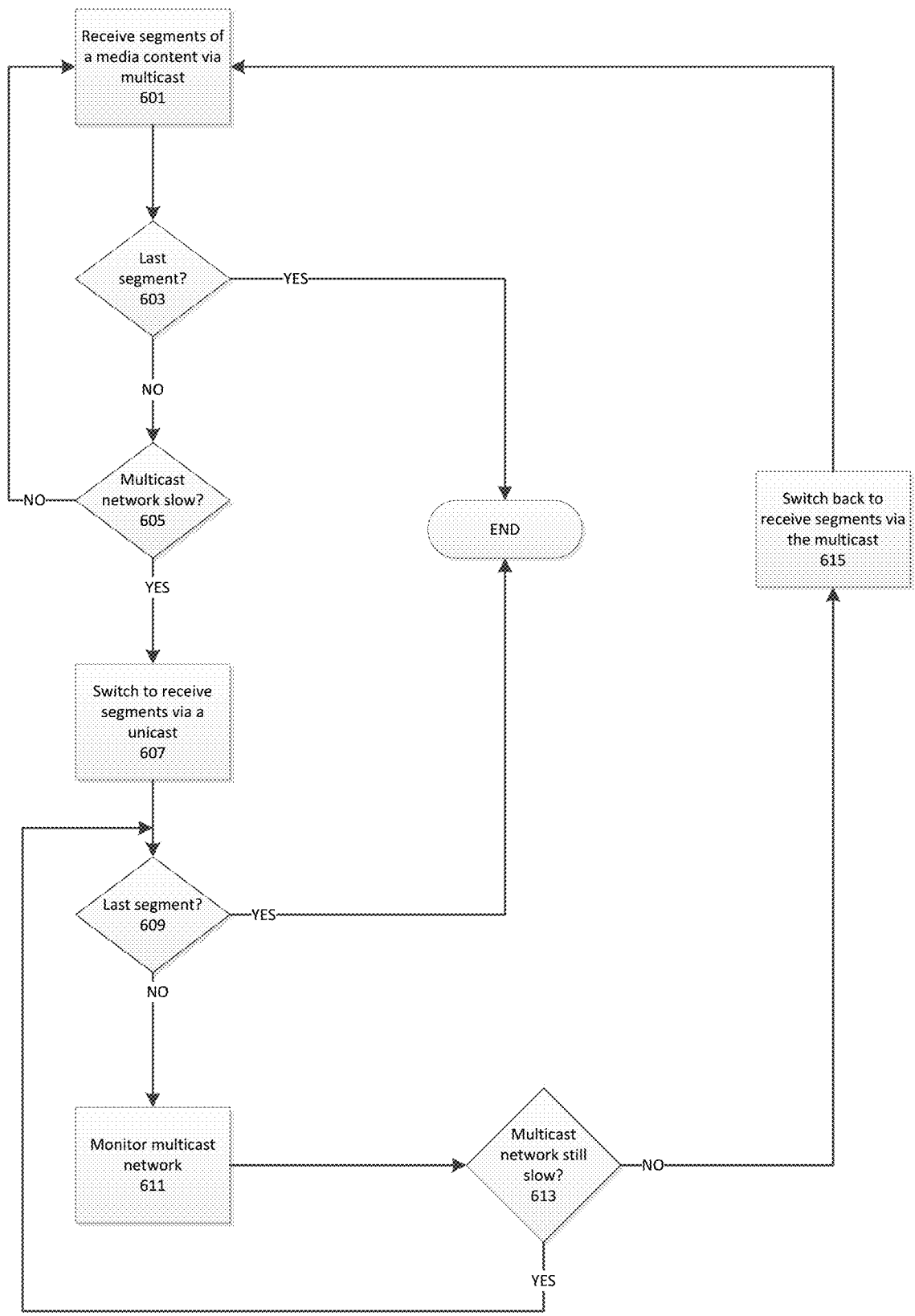
FIG. 6 is a flow chart showing an example method for switching between a multicast transmission and a unicast transmission.

FIG. 6 is a flow chart showing an example method for switching between a multicast transmission and a unicast transmission. In step 601, a computing device may receive segments of a media content item via a multicast transmission. The computing device may be the client device 301 and receipt of the segments via the multicast transmission may be from the high-bitrate multicast server 303 and/or the low-bitrate multicast server 305.

In step 603, a determination may be made as to whether the last segment of the segments of the media content item has been received. If the last segment is confirmed as received in step 603, the process may end. If not, the process may move to step 605 where a determination may be made as to whether receipt of segments from the multicast server 303 in step 601 is determined to be slow and/or below some threshold. The rate of arrival of the segments of the media content item may be used to determine whether receipt of segments from the multicast server 303 in step 601 is slow and/or otherwise fails to satisfy an applicable threshold. The rate of arrival of the segments may be determined by an established sequence for transmission and expected receipt. A threshold rate of arrival may be known and/or established for comparison against the rate of arrival of the segments. Patterns associated with latency in segment rate of arrival and/or missing the arrival of a segment altogether may be recognized. If the determination in step 605 is no, the process may return to step 601 where the computing device may continue to receive segments of the media content item via the multicast transmission.

If the determination in step 605 is yes, the process may proceed to step 607 where the computing device may switch to receive additional segments of the media content item via a unicast transmission. The computing device may receive the additional segments in step 607 from the unicast server 307. In step 609, a determination may be made as to whether the last segment of the segments of the media content item has been received. If the last segment is confirmed as received in step 609, the process may end. If not, the process may move to step 611 where the client device may monitor the multicast transmission. As part of this step 611, the client device may rejoin the multicast group that is receiving a multicast transmission via the multicast transmission and may determine a rate of arrival of the segments of the media content item. Proceeding to step 613, a determination may be made as to whether receipt of segments from the multicast server 303 is determined to be slow and/or otherwise fails to satisfy an applicable threshold by the monitoring in step 611. Determination of whether receipt of segments from the multicast server 303 in step 611 is determined to be slow and/or below some threshold may be by the rate of arrival of the segments of the media content item.

If multicast network problems persist, the process may return to receiving segments via the unicast transmission allowing for the rate of arrival of segments from the multicast server 303 to be periodically sampled. However, if the previous latency and/or segment loss that earlier caused the client device 301 to determine to switch to the unicast server in step 607 is no longer an issue, the client device may determine to switch back to receiving segments from the multicast server in step 615 before returning to step 601.

Figure 7:
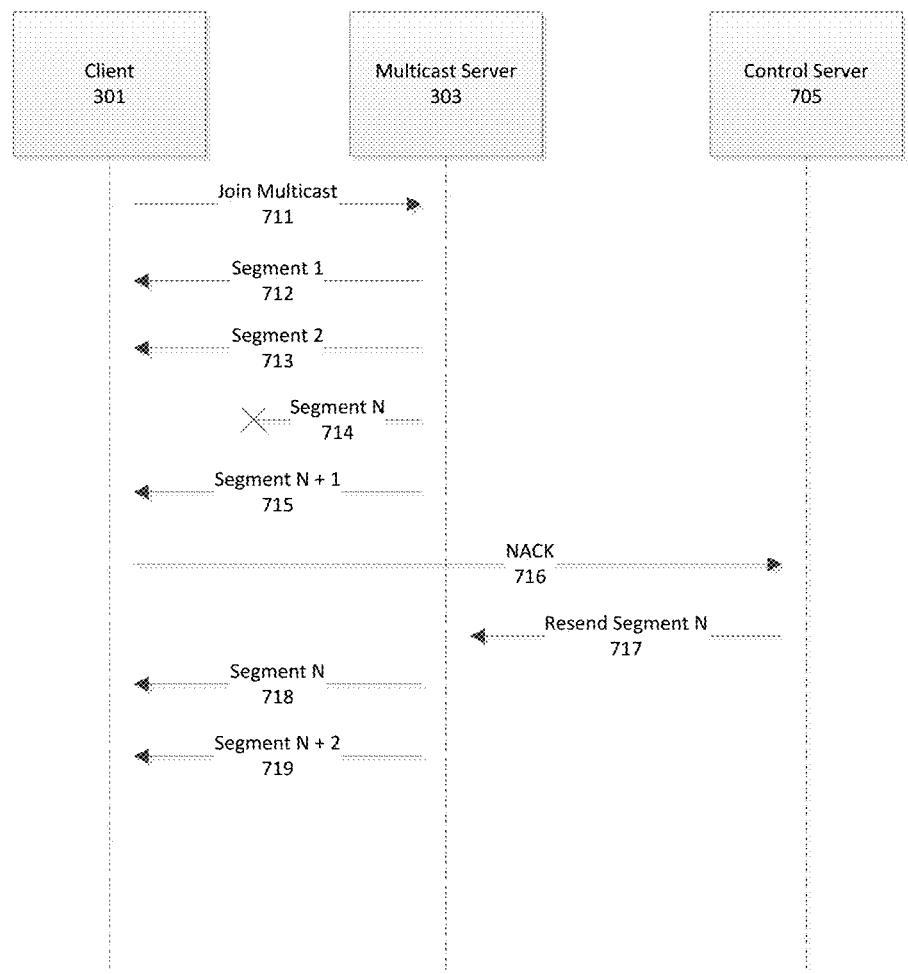
FIG. 7 shows an example system for managing reception of a missing segment of a media content item.

FIG. 7 shows an example system for managing reception of a missing segment of a media content item. The client device 301 may join the multicast group 711 that is receiving the multicast transmission from the multicast server 303 to receive segments that it would then use to playback subsequent portions of a media content item. The client device 301 is but one example computing device that may seek to join the multicast group that is receiving the multicast transmission from the multicast server 303. Any of a number of client devices may seek to join the multicast group that is receiving the multicast transmission from the multicast server 303. The multicast server 303 may apply a sequence to transmit segments of the media content item. For example, the multicast server 303 may transmit the segments of a media content item as a sequence of ordered segments. Segment 1 712, Segment 2 713, Segment N 714, and Segment N+1 715 are shown transmitted by the multicast server 303. In this example, Segment N 714 is never received by the client device 301. This failure to receive Segment N may be an example where the client device 301 can no longer wait to receive segments for playback since such latency is outside of an allowable threshold to ensure playback of the content item as desired by a viewer. In response, the client device 301 may open a unicast connection (e.g., transmission control protocol (TCP) connection) to a control server 705. The unicast connection may comprise an indication that a particular segment was not received, e.g., a negative acknowledgement (NACK or NAK) message indicating a failure to receive Segment N and/or a request to have Segment N resent. After receipt of the NACK message 716, the control server 705 may send an order to the multicast server 303 to resend Segment N 717. Following receipt of the order, the multicast server 303 is shown to transmit Segment N 718 and continue transmission of additional segments of the media content item, including Segment N+2 719.

Figure 8:
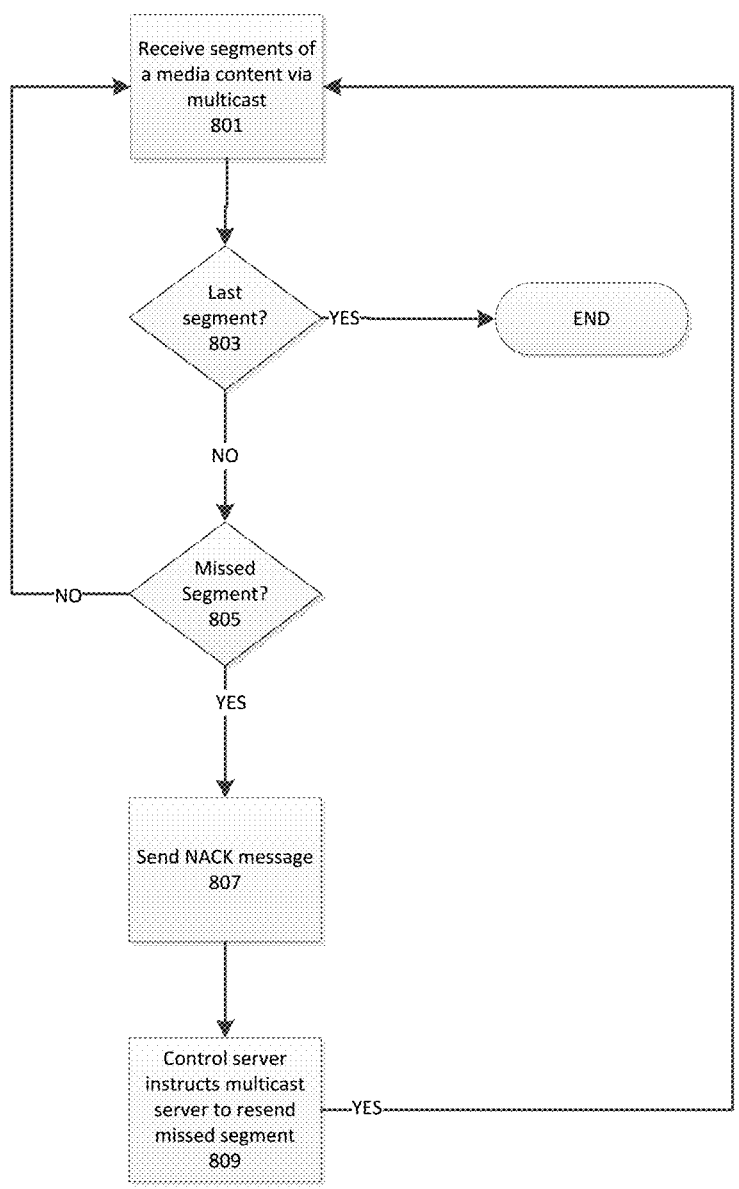
FIG. 8 is a flow chart showing an example method for requesting retransmission of a missing segment of a media content item.

FIG. 8 is a flow chart showing an example method for requesting retransmission of a missing segment of a media content item. In step 801, a computing device may receive segments of a media content item via a multicast transmission. The computing device may be the client device 301 and receipt of the segments via the multicast transmission may be from the high-bitrate multicast server 303 and/or the low-bitrate multicast server 305.

In step 803, a determination may be made as to whether the last segment of the segments of the media content item has been received. If the last segment is confirmed as received in step 803, the process may end. If not, the process may continue to step 805 where a determination may be made as to whether receipt of segments from the multicast server 303 in step 801 is determined to have missed a segment. Determination of whether a segment was missed may be by a rate of arrival of the segments of the media content item that is anticipated. The rate of arrival of the segments may be by an established sequence for transmission and expected receipt. A threshold rate of arrival may be known and/or established for comparison against the rate of arrival of the segments. Patterns associated with missing the arrival of a segment may be recognized. If the determination in step 805 is no, the process may return to step 801 where the computing device may continue to receive segments of the media content item via the multicast transmission.

If the determination in step 805 is yes, the process may proceed to step 807, where the computing device may send a NACK message indicating a failure to receive a particular segment and/or a request to have the particular segment resent. After receipt of the NACK message, a control server, such as control server 705, may send an order in step 809 to the multicast server 303 to resend the particular missed segment. The process may then return to step 801 for the client device to receive the missed segment via the multicast transmission.

Figure 9:
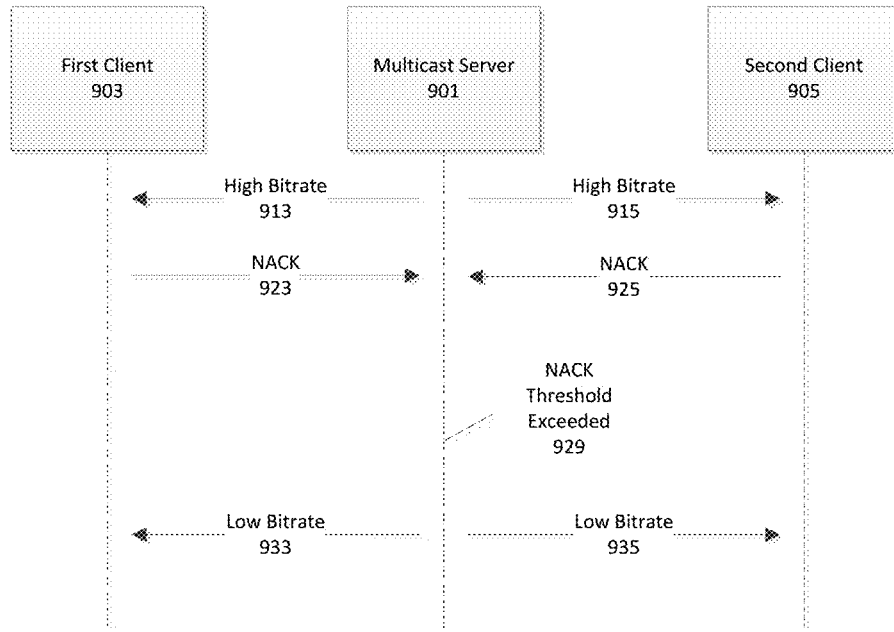
FIG. 9 shows an example system for managing multiple requests for retransmission of a missing segment of a media content item.

FIG. 9 shows an example system for managing multiple requests for retransmission of a missing segment of a media content item. First client device 903 and second client device 905 have joined a multicast group that is receiving a multicast transmission from a multicast server 901 to receive segments that it would then use to playback portions of a media content item. The first client device 903 and the second client device 905 are but two example computing devices that may request data from the multicast server 902. Additional client devices may join the multicast group that is receiving the multicast transmission from the multicast server 901. The multicast server 901 may apply a sequence to transmit segments of the media content item. For example, the multicast server 901 may transmit the segments of a media content item as a sequence of ordered segments received, at a high bitrate 913, by the first client device 903 and received, at the high bitrate 915, by the second client device 905. In this example, a particular segment is never received by the first client device and the second client device. This failure to receive the particular segment may be an example where the first client device 903 and the second client device 905 can no longer wait to receive segments for playback since such missing segment transmissions are outside of an allowable threshold to ensure playback of the content item as desired by viewers. In response, first client device may send a NACK message 923 to the multicast server 901 and the second client device may send a NACK message 925 to the multicast server 901. The NACK messages may indicate a failure to receive the missing segment and/or a request to have the missing segment resent.

After receipt of the NACK messages 923 and 925, the multicast server 901 may determine at 929 that a NACK threshold for a missing segment has been exceeded. For example, the multicast server may continue to transmit at a high bitrate until the threshold number of NACK messages for a missing segment has been exceeded. If the threshold number of NACK messages has been exceeded, the multicast server 901 may switch to transmit the missing segment and continue transmission of additional segments of the media content item as a sequence of ordered segments received, at a lower bitrate 933, by the first client device 903 and received, at the lower bitrate 935, by the second client device 905.

Figure 10:
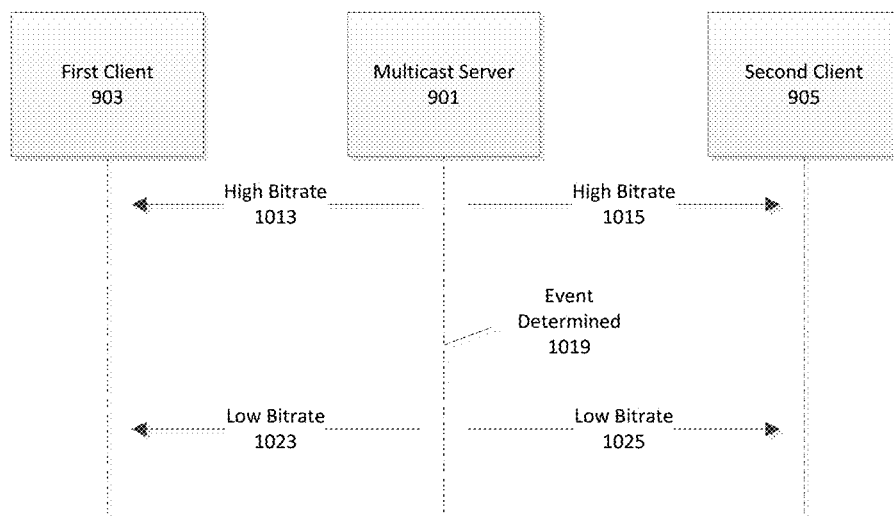
FIG. 10 shows an example system for managing an upcoming predetermined load on a transmission network.

FIG. 10 shows an example system for managing an upcoming predetermined load on a transmission network. The first client device 903 and the second client device 905 are shown to have joined a multicast group that is receiving a multicast transmission from a multicast server 901 to receive segments that it would then use to playback portions of a media content item. The first client device 903 and the second client device 905 are but two example computing devices that may request data from the multicast server 902. The multicast server 901 may transmit the segments of a media content item as a sequence of ordered segments received, at a high bitrate 1013, by the first client device 903 and received at the high bitrate 1015, by the second client device 905. In this example, the multicast server 901 may determine that there is an anticipated increase in the number of client devices expected to request data from the multicast server for receipt of segments of a media content item scheduled to be transmitted in the future. The anticipated increase in the number of client devices expected to request data from the multicast server may take into account a popularity score of the media content item. In other examples the anticipated increase may take into account the fact that the media content item is a live event media content item, such as a concert or football game.

The multicast server 901 may determine whether the anticipated increase exceeds a threshold. For example, if the anticipated increase of client devices expecting to request data from the multicast server to receive a future media content item is low, e.g., the future media content item for transmission has a low popularity score, the multicast server 901 may determine to transmit the future media content item at its scheduled time at a high bitrate to all joined client devices. Alternatively, the multicast server 901 may determine that the anticipated increase of client devices is high 1019, e.g., the future media content item is expected to be highly watched, the multicast server 901 may determine to switch to transmit the future media content item at its schedule time at a lower bitrate to all joined client devices. In such an example, the multicast server 901 may switch to transmit the future content item at a low bitrate 1023 to the first client device 903 and at the low bitrate 1025 to the second client device 905.

In one example, multicast server 901 may be configured to transmit a multicast transmission to a multicast group of client devices that have joined. In such an example, the multicast server 901 may determine that the anticipated increase of client devices is high 1019, and the multicast server 901 may determine to switch to transmit the future media content item at its schedule time as a unicast transmission to one or more client device. In such an example, the multicast server 901 may be configured to transmit a unicast transmission to one or more client devices of the multicast group by switching to transmit the future content item via unicast transmission to the first client device 903 and via separate unicast transmission to the second client device 905.

Figure 11:
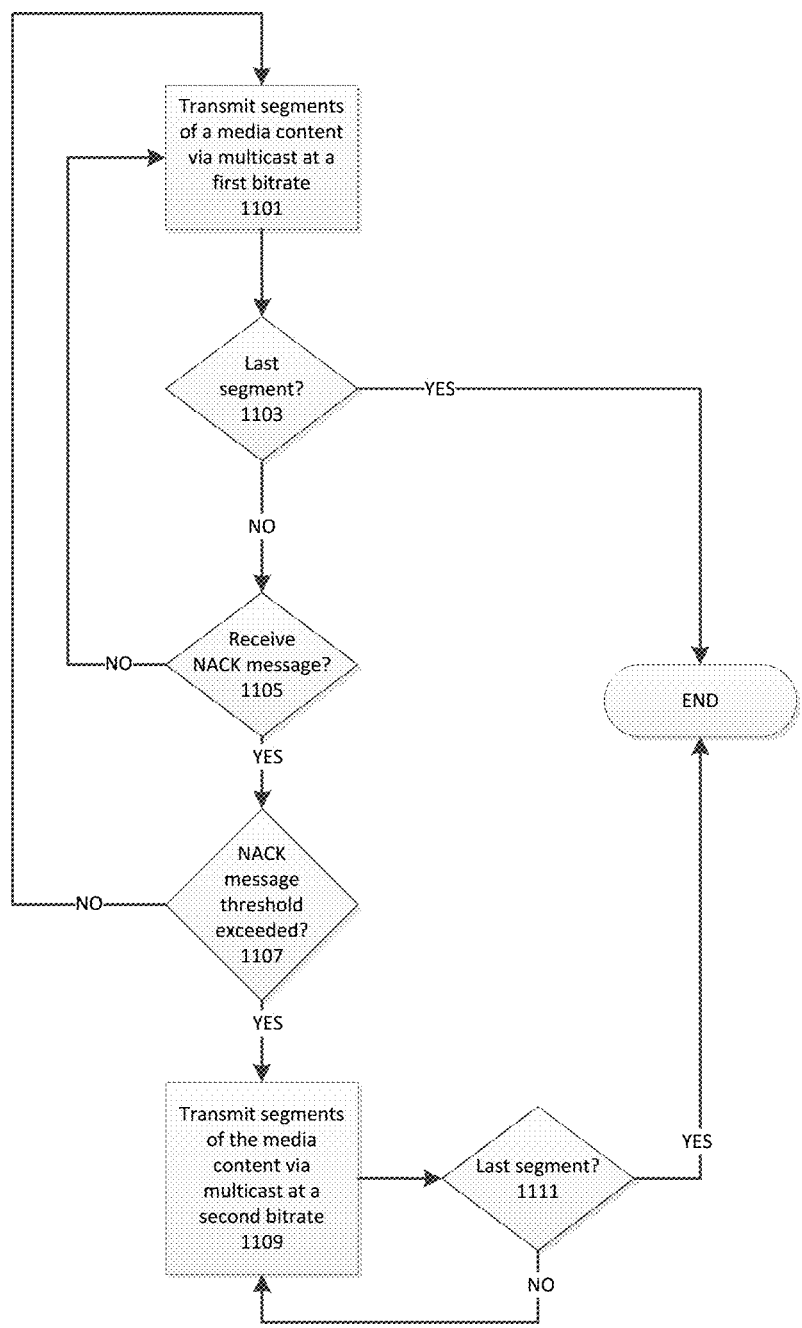
FIG. 11 is a flow chart showing an example method for modifying transmission of a media content item after receipt of a threshold number of retransmission requests.

FIG. 11 is a flow chart showing an example method for modifying transmission of a media content item after receipt of a threshold number of retransmission requests. In step 1101, a multicast server may transmit segments of a media content item at a first bitrate. The multicast server may be one of the multicast servers 901, 303, and/or 305 and receipt of the segments via the multicast transmission may be by a client device, such as one of the client devices 903, 905, and/or 301. The first bitrate of the multicast transmission in step 1101 may be a high bitrate.

In step 1103, a determination is made as to whether the last segment of the segments of the media content item has been received. If the last segment is confirmed as received in step 1103, the process may end. If not, the process may move to step 1105 where a determination may be made as to whether the multicast server has received a NACK message from a client device joined to the multicast server. Such a NACK message may be an indication by a client device that the client device failed to receive a particular segment of the media content item transmitted by the multicast server. If no NACK message has been received in step 1105, the process may return to step 1101.

If a NACK message is received in step 1105, the process may continue to step 1107 where a determination may be made as to whether a NACK threshold for a missing segment has been exceeded. For example, if the NACK message received in step 1105 is a first NACK message, and the threshold number of NACK message may be 10, the multicast server may determine the threshold to not be exceeded. If such is the case, the process may return to step 1101 where another segment of the media content may be transmitted. If the NACK message threshold has been exceeded in step 1107, in step 1109 the multicast server may switch to transmit the missing segment and continue transmission of additional segments of the media content item at a second bitrate. The second bitrate may be a lower bitrate than the first bitrate in step 1101. In step 1111, a determination may be made as to whether the last segment of the segments of the media content item has been received. If the last segment is confirmed as received in step 1111, the process may end. If not, the process may continue to step 1109.

Figure 12:
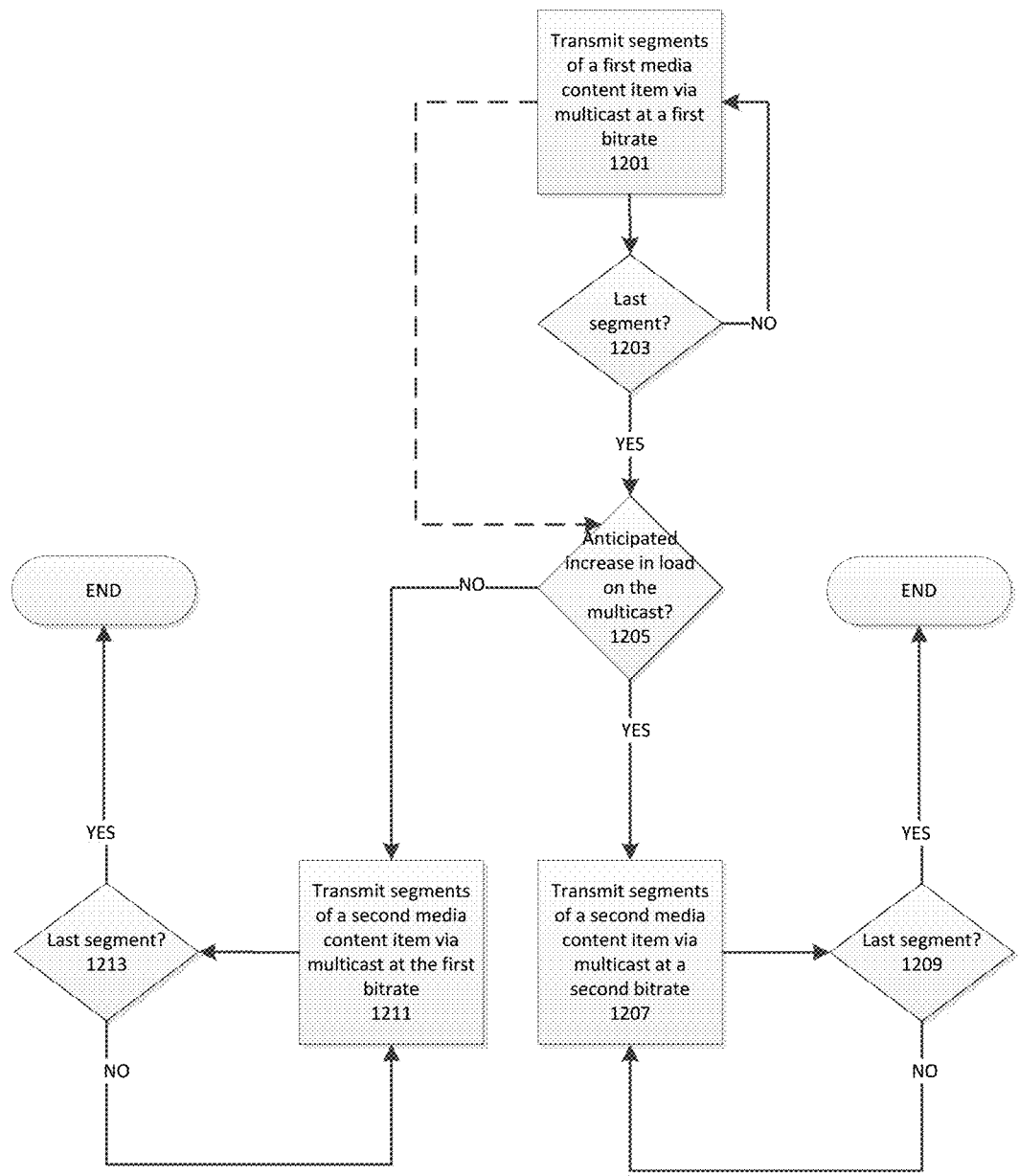
FIG. 12 is a flow chart showing an example method for modifying transmission of a media content item after determining that request for receipt of the media content item will cause a predetermined load on a transmission network.

FIG. 12 is a flow chart showing an example method for modifying transmission of a media content item after determining that request for receipt of the media content item will cause a predetermined load on a transmission network. In step 1201, a multicast server may transmit segments of a first media content item at a first bitrate. The multicast server may be one of the multicast servers 901, 303, and/or 305 and receipt of the segments via the multicast transmission may be by a client device, such as one of the client devices 903, 905, and/or 301. The first bitrate of the multicast transmission in step 1201 may be a high bitrate.

In step 1203, a determination may be made as to whether the last segment of the segments of the first media content item has been received. If the last segment is not confirmed as received in step 1203, the process may return to step 1201. If the last segment of the first content item is confirmed received in step 1203, the process moves to step 1205 where a determination is made as to whether the there is an anticipated increase in the number of client devices expected to request data from the multicast server for receipt of segments of a second media content item scheduled to be transmitted in the future that has exceed a threshold. In an alternative example shown by dashed line, following step 1201, the process may proceed to step 1205 whether a last segment of the first media content item has been received.

If the anticipated number of client devices exceeds a threshold number of client devices in step 1205, the process may continue to step 1207 where the multicast server may switch to transmit the segments of the second media content item at its scheduled time at a second bitrate. The second bitrate may be a lower bitrate than the first bitrate in step 1201. In step 1209, a determination may be made as to whether the last segment of the segments of the second media content item has been received. If the last segment is confirmed as received in step 1209, the process may end. If not, the process may return to step 1207.

Returning to step 1205, if the anticipated number of client devices does not exceed a threshold number of client devices, the process may continue to step 1211 where the multicast server may transmit the segments of the second media content item at its scheduled time at the first bitrate as in step 1201. In step 1213, a determination may be made as to whether the last segment of the segments of the second media content item has been received. If the last segment is confirmed as received in step 1213, the process may end. If not, the process may return to step 1211.

One or more features may be implemented using computer-usable data and/or computer-executable instructions, such as in one or more program modules, executed by one or more computers or other devices. Program modules may include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. In addition, the functionality may be implemented in whole or in part in firmware or hardware equivalents such as integrated circuits and/or field programmable gate arrays ("FPGA"). Particular data structures may be used to more effectively implement one or more features of the disclosure, and such data structures are contemplated within the scope of computer executable instructions and computer-usable data described herein.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a first computing device via a first multicast transmission and at a first bitrate, a plurality of segments of a media content item, wherein each of the segments is less than the entire media content item;
determining a rate of arrival of the plurality of segments;
after determining that the rate of arrival does not satisfy a threshold rate of arrival, receiving, by the first computing device via a second multicast transmission and at a second bitrate, at least one additional segment of the media content item, wherein the first and second bitrates are different;
determining a time period based on a difference between a first time stamp, corresponding to a first time in a playback of the media content item at which the at least one additional segment begins, and a second time stamp corresponding to a second time in a playback of the media content item at which a first segment of the plurality of segments begins, wherein the first time is different from the second time, wherein the first segment of the plurality of segments and the at least one additional segment each contain data that represents at least some of the same part of the media content item; and
after expiration of the determined time period, stopping receipt of the media content item via the first multicast transmission at the first bitrate.

2. The method of claim 1, wherein the at least one additional segment of the media content item comprises a datagram.

3. The method of claim 1, further comprising:
prior to receiving the at least one additional segment of the media content item, receiving, by the first computing device via a third multicast transmission at a third bitrate, at least one second additional segment of the media content item,
wherein the first bitrate is a higher bitrate than the third bitrate.

4. The method of claim 1, further comprising stopping receipt, via the second multicast transmission, of segments of the media content item following the at least one additional segment of the media content item.

5. The method of claim 4, further comprising:
determining the first time stamp; and
determining the second time stamp.

6. The method of claim 5, further comprising:
prior to the stopping receipt via the first multicast transmission, buffering the at least one additional segment of the media content item received via the second multicast transmission until the expiration of the determined time period.

7. The method of claim 6, further comprising beginning playback, by the first computing device, of the buffered at least one additional segment of the media content item received via the second multicast transmission.

8. The method of claim 5, further comprising after stopping the receipt via the first multicast transmission, receiving, by the first computing device and via a resumed multicast transmission at the first bitrate, a second plurality of segments of the media content item.

9. The method of claim 1, wherein the determining the rate of arrival of the plurality of segments comprises applying machine learning to recognize a pattern associated with a latency in receipt of at least one segment of the plurality of segments.

10. The method of claim 9, wherein the pattern indicates that the at least one additional segment is to be received via the second multicast transmission.

11. A method comprising:
receiving, by a first computing device via a first multicast transmission, a plurality of segments of a media content item, wherein each of the segments is less than the entire media content item;
determining, based on comparing a rate of arrival of the plurality of segments with a threshold rate of arrival, that the rate of arrival does not satisfy the threshold rate of arrival;
based on the determining that the rate of arrival does not satisfy the threshold rate of arrival, receiving, by the first computing device via a second multicast transmission, at least one additional segment of the media content item;
determining a difference in time between a first time stamp for the at least one additional segment of the media content item and a second time stamp for a first segment, of the plurality of segments, that represents at least some part of the media content item represented in the at least one additional segment, wherein the first time stamp is a first time in a playback of the media content item at which the at least one additional segment begins and the second time stamp is a second time, different from the first time, in a playback of the media content item at which the first segment of the plurality of segments begins; and
buffering, until the determined difference in time has elapsed, segments of the media content item received via the second multicast transmission.

12. The method of claim 11, further comprising:
ending, after the buffering the segments of the media content item received via the second multicast transmission, receipt, via the first multicast transmission, of segments, of the media content item, following the plurality of segments.

13. The method of claim 11, further comprising ending, after the determined difference in time has elapsed, receipt, via the first multicast transmission, of segments, of the media content item, following the plurality of segments.

14. The method of claim 11, further comprising determining, by applying machine learning to recognize a pattern associated with a latency in receipt of one or more segments of the plurality of segments, the rate of arrival of the plurality of segments.

15. The method of claim 14, wherein the pattern indicates that the at least one additional segment is to be received via the second multicast transmission.

16. The method of claim 11, further comprising beginning playback, by the first computing device, of the buffered segments of the media content item received via the second multicast transmission.

17. An apparatus comprising:
one or more processors;
memory storing instructions that, when executed by the one or more processors, cause the apparatus to:
receive, via a first multicast transmission, a plurality of segments of a media content item, wherein each of the segments is less than the entire media content item;
determine, based on comparing a rate of arrival of the plurality of segments with a threshold rate of arrival, that the rate of arrival does not satisfy the threshold rate of arrival;

based on the determination that the rate of arrival does not satisfy the threshold rate of arrival, receive, via a second multicast transmission, at least one additional segment of the media content item;

determine a difference in time between a first time stamp for the at least one additional segment of the media content item and a second time stamp for a first segment, of the plurality of segments, that represents at least some part of the media content item represented in the at least one additional segment, wherein the first time stamp is a first time in a playback of the media content item at which the at least one additional segment begins and the second time stamp is a second time, different from the first time, in a playback of the media content item at which the first segment of the plurality of segments begins; and buffer, until the determined difference in time has elapsed, segments of the media content item received via the second multicast transmission.

18. The apparatus of claim 17, wherein the instructions, when executed by the one or more processors, further cause the apparatus to stop, after buffering the segments of the media content item received via the second multicast transmission, receipt, via the first multicast transmission, of segments, of the media content item, following the plurality of segments.

19. The apparatus of claim 17, wherein the instructions, when executed by the one or more processors, further cause the apparatus to stop, after the determined difference in time has elapsed, receipt, via the first multicast transmission, of segments, of the media content item, following the plurality of segments.

20. The apparatus of claim 17, wherein the instructions, when executed by the one or more processors, further cause the apparatus to begin playback of the buffered segments of the media content item received via the second multicast transmission.

* * * * *